US007931876B2

(12) United States Patent
Nakano et al.

(10) Patent No.: US 7,931,876 B2
(45) Date of Patent: Apr. 26, 2011

(54) METHOD AND APPARATUS FOR MANUFACTURING DEVELOPER, AND DEVELOPER

(75) Inventors: Shinichi Nakano, Nara (JP); Yasuhiro Shibai, Nara (JP); Keiichi Kikawa, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 12/317,033

(22) Filed: Dec. 17, 2008

(65) Prior Publication Data

US 2009/0117479 A1 May 7, 2009

Related U.S. Application Data

(62) Division of application No. 10/772,070, filed on Feb. 3, 2004, now abandoned.

(30) Foreign Application Priority Data

Feb. 5, 2003 (JP) .................................. 2003-28528

(51) Int. Cl.
*B01J 19/18* (2006.01)
*G03G 5/00* (2006.01)

(52) U.S. Cl. ........ 422/225; 422/226; 422/135; 430/105; 430/137.1; 430/137.14; 430/137.21

(58) Field of Classification Search .................. 422/225, 422/226, 135; 430/105, 137.1, 137.14, 137.21
See application file for complete search history.

(56) References Cited

U.S. PATENT DOCUMENTS 6,299,906 B1 10/2001 Bausch et al.
2001/0036586 A1* 11/2001 Adachi et al. .............. 430/110.1

FOREIGN PATENT DOCUMENTS

| | | | |
|---|---|---|---|
| EP | 0 526 699 | * | 2/1993 |
| EP | 526699 | A1 | 2/1993 |
| JP | 61-293536 | * | 12/1986 |
| JP | 61293536 | A | 12/1986 |
| JP | 08-141306 | | 6/1996 |
| JP | 11047572 | A | 2/1999 |
| JP | 2001-312098 | | 11/2001 |

* cited by examiner

*Primary Examiner* — Walter D Griffin
*Assistant Examiner* — Lessanework Seifu
(74) *Attorney, Agent, or Firm* — George W. Neuner; Edwards Angell Palmer & Dodge LLP

(57) ABSTRACT

The invention provides a method and an apparatus for manufacturing a developer, which can manufacture a developer having a uniform and fine particle shape in a narrow particle size distribution and having a coloring agent highly dispersed therein at the primary particle level, the method and apparatus at the same time enabling continuous and efficient production without opening and closing a reactor. The method comprises the steps of: dissolving a binding resin component in a supercritical or subcritical fluid so that the binding resin component is blended with a coloring agent component; and reducing the solubility of the binding resin component in the supercritical or subcritical fluid so that the binding resin component is precipitated in the form of particles with the coloring agent component dispersed in the interior thereof. In the aforementioned method and apparatus, the reactor provided with at least a stirring mechanism and a mechanism for discharging dissolved components has a developer material carrier comprising a mesh that prevents the passage of treated materials and allows the passage of the supercritical or subcritical fluid.

11 Claims, 4 Drawing Sheets

METHOD AND APPARATUS FOR MANUFACTURING DEVELOPER, AND DEVELOPER

CROSS-REFERENCE TO RELATED APPLICATIONS

This application is a division of Ser. No. 10/772,070 filed Feb. 3, 2004.

FIELD OF THE INVENTION

The present invention relates to a developer for developing an electrostatic latent image formed on an image carrier by an electrophotographic process or an ion-flow method, a manufacturing method thereof, and a manufacturing apparatus thereof.

BACKGROUND OF THE INVENTION

Image forming apparatuses such as a laser printer, LED (light emitting diode) printer, or a digital photocopying machine, employ an electrophotographic method. These apparatuses electrify the entire surface of a photoreceptor and create a desired electrostatic latent image by irradiating the surface with light in accordance with image information by use of a laser beam, LED or the like. The electrostatic latent image is visualized with a developer by a developing section to form a visible image, and the visible image is fixed onto a recording medium, thereby obtaining an image.

Recently, there has been an increasing demand for size-reduced image forming apparatuses. In an image forming apparatus employing the electrophotographic method, the developer storage section is a significant part of the image forming apparatus in terms of achieving size reduction because the space occupied by the developer storage section is large. In particular, in the recent networked environment, a single image forming apparatus is used by a number of people for a great number of printouts. Therefore, for users' convenience, a large quantity of developer must be stored in the image forming apparatus.

Recently, there has also been an increasing demand for color image output. Since a color image forming apparatus uses developers of three or four colors, the space occupied by the developers in the image forming apparatus becomes much larger. Further, when color reproduction for color images is carried out by multi-color overlapping, the amount of developer used on a recording medium (e.g., paper and an OHP sheet) becomes large. For thermally fixing such large amounts of developer, larger amounts of heat are necessary compared with the case of monochrome images, thus requiring a large fixing section.

In addition, there is a demand for a method for manufacturing a developer that saves more energy and is more environment-friendly. Developer manufacturing methods that are currently available and mainly used include a conventional method involving melting, kneading, and grinding processes, and recently introduced polymerization methods (e.g., suspension method, emulsion method, and dispersion method) in a liquid solvent.

For example, a developer used for a dry developing method contains a thermoplastic resin (binding resin), a pigment (coloring agent) and a mold release agent as main components. In addition, magnetic powder, a charge control agent, a flow improver or the like may be added, if necessary, for the production of the developer. Then, a method for manufacturing such developer is generally adopted wherein all the raw materials are mixed at one time, and heated, melted and dispersed by a kneading machine, etc. to obtain homogeneous composition. Then the obtained composition is cooled, crushed, and classified to obtain a developer having a volume average particle diameter of approximately 10 μm.

In particular, a color developer for electrophotography used for the formation of color images is generally manufactured by dispersing various chromatic color pigments in a binding resin. For such cases, performances required for the developer that is used are higher than those in the case of obtaining black images. In other words, as a developer, proper color development (color degree) or optical transparency (transparency), when the developer is used for a sheet for an overhead projector (OHP), is required, in addition to mechanical and electronic stability with respect to extrinsic factors such as mechanical shocks or humidity.

A developer that contains a pigment as a coloring agent is exemplified by JP Patent Publication (Kokai) No. 49-46951 A (1974) stated below. However, a pigment-containing color developer exhibits poor pigment dispersibility in a binding resin, resulting in inferior color degree (color development) and transparency, although it has excellent light resistance.

As methods for improving the dispersibility of a pigment in a binding resin, the following technologies are proposed.

(1) A technology for obtaining a color developer by using a polyester resin (resin A) as a binding resin, coating a pigment in advance with a polyester resin (resin B) with a molecular weight higher than resin A, and dispersing the coated pigment in resin A (JP Patent Publication (Kokai) No. 62-280755 A (1987)).

(2) A color developer characterized in that a processed pigment obtained by melting and kneading a pigment and a resin for the pigment is dispersed and contained in a binding resin, the resin for pigment has a smaller weight average molecular weight than the binding resin, and the binding resin has a weight average molecular weight of 100,000 or more (JP Patent Publication (Kokai) No. 2-66561 A (1990)).

(3) A technology for obtaining a color developer by the following steps. In a first step, a mixture of a binding resin and a pigment is kneaded with an organic solvent at a temperature lower than the melting point of the binding resin. In a second step, the binding resin and a charge control agent are further added, and melted and kneaded by heat (JP Patent Publication (Kokai) No. 9-101632 A (1997)).

(4) A pigment used for a developer has a low molecular weight material absorbed therein, the low molecular weight material having a lower melting point and a lower melt viscosity than a binding resin as a principal constituent component of the developer. The oil absorption of the low molecular weight material is 50 g or more (per 100 g of pigment) and the oil absorption ratio of the low molecular weight material to the pigment is 100% to 300% of the saturation oil absorption. The melt viscosity of the low molecular weight material is 0.1 Pa·s or less at 20° C. (the melting point of the low molecular weight material). In addition, a pretreatment method of developer pigment, a developer and a manufacturing method of the developer are also proposed in JP Patent Publication (Kokai) No. 2000-81736 A.

However, none of the methods disclosed in these patent documents can provide sufficient pigment dispersion, thus currently resulting in inferior color degree and transparency. Further, in the case of a black developer for monochrome images, carbon is commonly used as a black coloring agent in an amount of 7 to 15 parts by weight. For manufacturing such black developer, a method is commonly used wherein carbon powder is mixed with other raw materials before kneading and then the mixture is melted and kneaded. Unlike a color developer, transparency is not required for a black developer, and therefore the amount of carbon is increased to enhance color degree. However, the increase of conductive carbon is not preferable in terms of the stability of electrical charge because it reduces the volume resistivity of the developer. It is thus necessary that the carbon should be thoroughly dispersed to increase the volume resistivity of a developer.

A two-step kneading method for the above color developer has not been adopted as a method for improving carbon dispersion due to its high cost, and in general (5) a method for reducing the treatment capacity in the kneading step is adopted. In addition, (6) a method for lowering resin temperature in the kneading step or (7) a method in which a rolling and cooling method is prescribed after kneading is proposed. However, the treatment capacity according to methods (5) to (7) is small, resulting in increased costs.

JP Patent Publication (Kokai) No. 8-141306 A (1996) discloses a technique regarding a method and a device for extraction of a fluid flowing in a radial direction whereby a predetermined material is extracted from a solid material (e.g., naturally occurring material and ceramics) using a supercritical fluid or a liquid. However, the technique disclosed therein is insufficient for reducing extraction period, and further, it is expensive since the treatment capacity is small.

SUMMARY OF THE INVENTION

In view of the above circumstances, the present invention has an object to provide a fluid extraction method and an apparatus therefor, which enable easy operations for inserting and removing treated materials and reduce dead space and increase treatment capacity.

As a result of intensive researches, the present inventors have found that the above object can be achieved by providing a specific developer material carrier in a reactor used in the method and apparatus for manufacturing a developer using a supercritical fluid or a subcritical fluid.

According to a first aspect of the present invention, a method for manufacturing a developer is provided. The method comprises the steps of: dissolving a binding resin component in a supercritical or subcritical fluid so that the binding resin component is blended with a coloring agent component, and reducing the solubility of the binding resin component in the supercritical or subcritical fluid so that the binding resin component is precipitated in the form of particles with the coloring agent component dispersed in the interior of the binding resin component. In the method, the reactor provided with at least a stirring mechanism and a mechanism for discharging dissolved components has a developer material carrier comprising a mesh that allows the passage of the supercritical or subcritical fluid and prevents the passage of the treated materials.

The main technology of the present invention involves at least a method for manufacturing a developer by: dissolving a binding resin component in a supercritical or subcritical fluid so that the binding resin component is blended with a coloring agent component; and reducing the solubility of the binding resin component so as to precipitate the binding resin component in the form of particles, so that a developer in which the coloring agent component is dispersed in the binding resin component precipitated in the form of particles is manufactured. When a developer is manufactured by dissolving a binding resin component in a supercritical or subcritical fluid and blending it with a coloring agent component without appropriate supply of developer materials, reducing the solubility of the binding resin component in the supercritical or subcritical fluid, and precipitating the binding resin component in the form of particles while the coloring agent component is dispersed in the binding resin component, a developer with a nonuniform composition may be produced. Namely, there is a case wherein some developers have excessive amounts of resin component but others have small amounts thereof. Therefore, uniform input amounts of the developer components are required.

In contrast, the present invention produces the following actions and effects. Namely, a developer material carrier is provided in a reactor having at least a stirring mechanism and a mechanism for discharging dissolved components. The developer material carrier comprises a filter that prevents the passage of treated materials and allows the passage of the supercritical or subcritical fluid, and thereby insoluble components are captured. This enables only the dissolved components to be dispersed in the supercritical or subcritical fluid in the reactor, thereby preventing the generation of coarse particles and enabling the generation of particles having a desired shape.

According to a second aspect of the present invention, there is provided an apparatus for manufacturing a developer comprising at least a reactor, a jet mechanism and a mechanism for connecting therebetween. The developer is manufactured by the apparatus through the steps of dissolving a binding resin component in a supercritical or subcritical fluid so that the binding resin component is blended with a coloring agent component, and reducing the solubility of the binding resin component in the supercritical or subcritical fluid so that the binding resin component is precipitated in the form of particles while the coloring agent component is dispersed in the interior of the binding resin component. In the apparatus, the reactor provided with at least a stirring mechanism and a mechanism for discharging dissolved components has a developer material carrier comprising a mesh that prevents the passage of treated materials and allows the passage of the supercritical or subcritical fluid.

The developer material carrier preferably comprises a plurality of meshes. Since the carrier comprises meshes, elution is more uniformly carried out, thereby enabling the obtainment of a developer having a desired particle diameter.

The developer material carrier preferably has a structure with a stirring mechanism incorporated thereinto. When the developer material carrier has such structure, the solubility speed of the developer material in the supercritical fluid or the subcritical fluid is increased, resulting in improved production efficiency.

The developer material carrier preferably rotates together with the stirring mechanism. The rotation of the developer material carrier together with the stirring mechanism activates the convection of the supercritical or subcritical fluid to improve the solubility speed of the developer material in the supercritical or subcritical fluid, and to prevent the passage of coarse particles.

The developer material carrier preferably rotates in reverse relative to the rotation direction of the stirring mechanism. The reverse rotation of the developer material carrier relative to the rotation direction of the stirring mechanism increases the frequency of contact between the supercritical fluid and the developer material, thereby enabling the increase of the solubility speed.

The developer material carrier preferably also functions as a stirring mechanism. When the developer material carrier also works as the stirring mechanism, the number of parts in the reactor is reduced, so that influences such as contaminations can be prevented.

According to a third aspect of the present invention, there is provided a developer for electrostatic development that is manufactured by the above manufacturing method or apparatus.

BRIEF DESCRIPTION OF THE DRAWINGS

FIG. 4A shows the results when the developer was manufactured by a crushing method. FIG. 4B shows the results when the developer was manufactured by a supercritical method.

DESCRIPTION OF PREFERRED EMBODIMENTS

Figure 1:
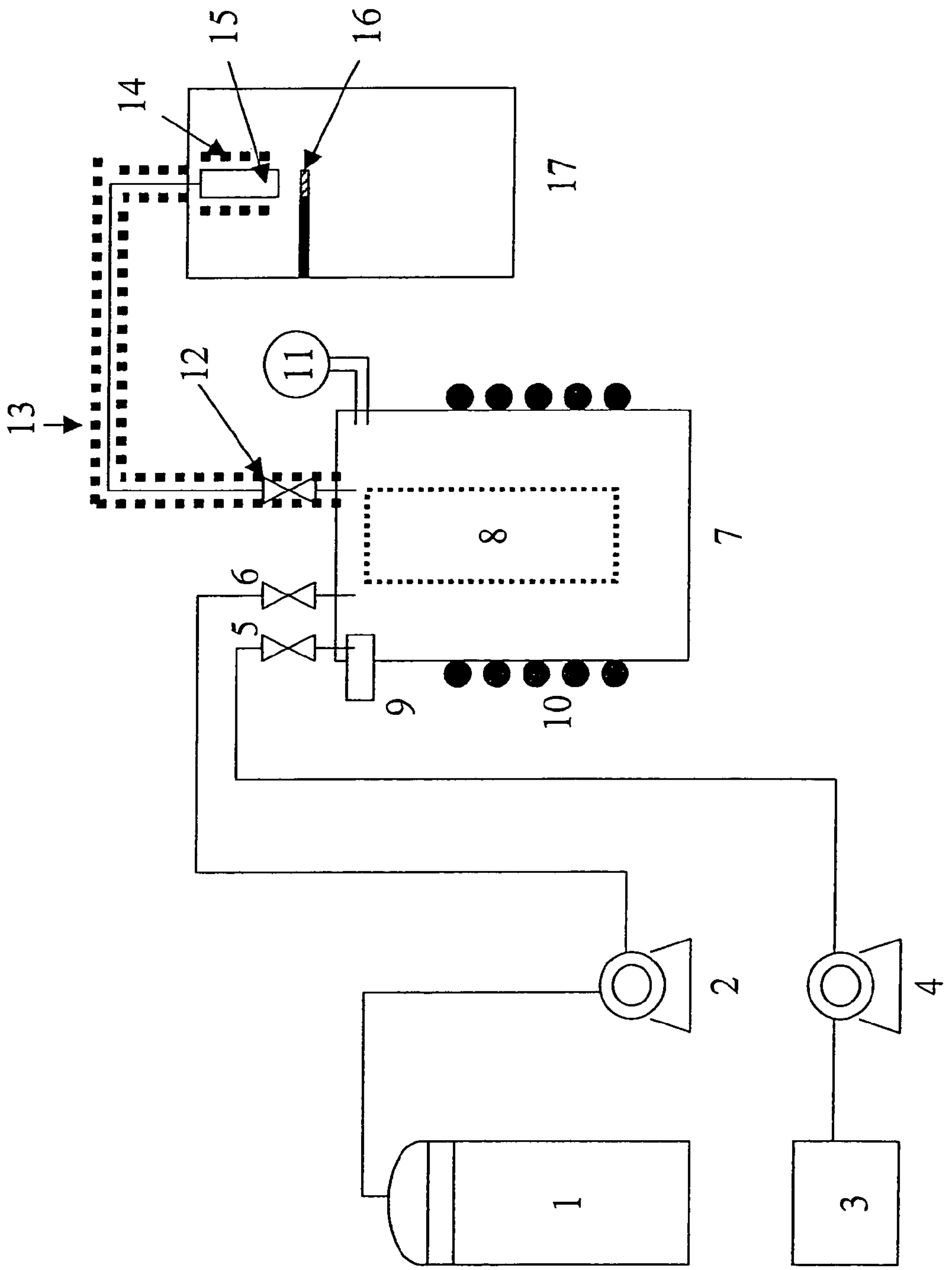
FIG. 1 is a diagram showing an apparatus used for manufacturing a developer according to the present invention.

The method of the present invention involves the steps of dissolving a binding resin component in a supercritical fluid or a subcritical fluid so that the binding resin component is blended with a coloring agent component, and lowering the solubility of the binding resin component in the supercritical or subcritical fluid so that the binding resin component is precipitated in particle form while the coloring agent component is dispersed in the interior of the binding resin component.

A substance will be in a fluid form with equal densities in gaseous and liquid phases when the temperature and the pressure of the substance are set to certain conditions (the supercritical point or higher). A fluid at a temperature and a pressure above the vicinity of the critical point is referred to as a supercritical fluid. Moreover, a substance will have a state close to that of a supercritical fluid when the conditions are below but close to those of a supercritical point. The substance in such fluid form is referred to as a subcritical fluid.

Supercritical or subcritical fluids (hereinafter, the term "supercritical fluid" includes a subcritical fluid unless otherwise specified) show the properties of both gases and liquids. For example, a supercritical fluid is made to have a density close to that of a liquid (100 times greater than that of a gas), a viscosity similar to that of a gas (about 10 to 100 times smaller than that of a liquid), a diffusion coefficient about 10 to 100 times smaller than that of a liquid, and a heat conductivity coefficient close to that of a liquid (about 100 times greater than that of a gas).

A supercritical fluid generally has a great dissolving power and properties such that the dissolving power largely varies in accordance with changes in temperature and pressure. The properties of a supercritical fluid make it excellent as a reaction solvent or an extraction solvent. In recent years, application of a supercritical fluid has been thus actively studied in the fields of separation, extraction, purification, and the like of substances, such as caffeine extraction from coffee and separation and extraction of wastes.

Further, a desired substance is dissolved in a supercritical fluid, and the solubility of the substance in the supercritical fluid is significantly decreased by rapid expansion of supercritical solution (RESS method) or by addition of a poor solvent or a surfactant, thereby precipitating the dissolved substance. By taking advantage of this feature, particulate production, for example, is carried out.

Methods for producing particulates by using a supercritical fluid are disclosed in, for example, JP Patent Publication (Kokai) No. 10-13341 A (1998). These are methods for producing particulates used for coating a developer, but the document includes no description of a production method of the developer itself.

The present inventors focused attention on the aforementioned properties concerning supercritical fluid, and attempted various applications of these properties for producing a developer. As discussed previously, it is important to enhance coloring power of a developer in order to achieve the miniaturization of an electrophotographic image forming apparatus using the developer. For this case, the dispersibility of the coloring agent component must be improved for increasing the amount of the coloring agent component in the developer.

In a process employing a developer material supply system after pressure reduction, features of the supercritical or subcritical fluid, that is, a great dissolving power and a large diffusion coefficient, are exhibited by blending a coloring agent component and a binding resin component of the developer in the supercritical fluid in a reactor. These features allow the dissolved substance (the coloring agent component) or the mixed-in substance (particulates of the coloring agent component) to be uniformly dispersed while preventing agglomeration. This produces a good dispersion of the coloring agent component in the supercritical fluid.

Subsequently, the dissolved solute components are precipitated, for example, by depressurizing the supercritical fluid in the reactor. At this time, when the solubility of the solutes in the supercritical fluid is rapidly reduced by RESS method or the like, the dissolved binding resin component is precipitated in the form of particulate. Since pigment is well dispersed in the supercritical fluid at this stage, a developer in the form of particulates can be obtained with the coloring agent component uniformly dispersed in the particulates of the binding resin component.

Examples of the substances that can be used as the supercritical fluid include $CO_2$, $N_2$, $CH_4$, $C_2H_6$, $CF_3H$, $NH_3$, $CF_3Cl$, $CH_3OH$, $C_2H_5OH$, and $H_2O$.

The binding resin component is not particularly limited as long as it is a resin used for a developer. However, examples thereof include styrene resins, such as polystyrene, styrene-butadiene copolymer and styrene-acrylic copolymer, ethylene resins, such as polyethylene, polyethylene-vinyl acetate copolymer, and polyethylene-vinyl alcohol copolymer, acrylate resins, such as polymethyl methacrylate, phenolic, resins, epoxy resins, allyl phthalate resins, polyamide resins, polyester resins, and maleic acid resins. The binding resin component preferably has a weight-average molecular weight of $1\times10^3$ to $1\times10^6$.

The coloring agent component includes organic pigments and inorganic pigments. Examples of these pigments include Carbon Black, Aniline Blue, Chalco Oil Blue, Chrome Yellow, Ultramarine Yellow, Methylene Blue, duPont Oil Red, Quinoline Yellow, Methylene Blue Chloride, Phtharocyanin Blue, Rose Bengal, Disazo Yellow; Carmin 6B, and Quinacridone. The particle diameter of the pigment (primary particle) is from 40 nm to 400 nm, and is preferably 100 nm to 200 nm.

In addition to the binding resin component and coloring agent component to be mixed in the supercritical fluid, a supplement additive (an entrainer) may be added for enhancing the affinity between the supercritical or subcritical fluid and the solutes.

Examples of the supplement additives, though depending on the combination of a supercritical fluid substance to be used and a solute to be blended therewith, include: alcohols such as methanol, ethanol, isopropanol, and butanol; ketones, such as methyl ethyl ketone, acetone, and cyclobexanone; ethers such as diethyl ether and tetrahydrofuran; hydrocarbons, such as toluene, benzene, and cyclohexane; esters, such as ethyl acetate, butyl acetate, methyl acetate, and alkyl carbonic ester; halogenated hydrocarbons, such as chlorobenzene and dichloromethane; water; and ammonia. It should be noted that water or ammonia can be used as supplement additives, only when they are not used as the supercritical or subcritical fluid.

Next, in a reactor having at least a stirring mechanism and a mechanism for discharging dissolved components, a mechanism that carries a developer material and allows only the dissolved components to be dissolved and dispersed in the supercritical or subcritical fluid in the reactor will be described.

An example for the above operation method and an apparatus according to the present invention will be explained. As an apparatus for manufacturing the developer of the present invention, an apparatus having a configuration as shown in FIG. 1 is exemplified. First, a gas is supplied to a reactor 7 from a gas cylinder 1 filled with a substance to be used as a supercritical fluid. Pressure is applied to the gas by a pressurizing pump 2 so that the gas has a desired pressure. Further, the pressure of an entrainer 3 (supplement additive) is increased to a desired level by a pressurizing pump 4 in the same manner. The high-pressure gas and the entrainer 3 are transferred to a reactor 7 via valves 5 and 6. During this process, the temperature of the high-pressure gas may be adjusted to be close to a desired level by a preheating coil or the like, which is not shown in the figure. Further, the supercritical gas and the entrainer 3 may be blended together in advance in another vessel (not shown) before being introduced into the reactor 7.

A binding resin component and a coloring agent component as developer materials are enclosed in the reactor 7. The reactor 7 is provided with, for example, a heater 10 or a constant-temperature water tank (not shown) to result in a desired temperature. Further, the pressure in the reactor 7 is adjusted to a desired level by the valves 5 and 6. The temperature and the pressure are monitored by a thermometer 9 and a pressure gauge 11.

In this way, a supercritical fluid having a supercritical state, the entrainer, the binding resin component, and the coloring agent component are blended together in the reactor 7. Here, a stirring device (e.g., a stirring device with impeller blades), though not shown in the figure, may be used to stir the contents of the reactor 7, if necessary.

A connecting mechanism from the reactor 7 to a nozzle 15 and the nozzle 15 itself can adjust the temperature of the high-pressure gas to close to a desired level by a preheating coil, for example. Further, a thermometer is installed in the vicinity of an outlet of the nozzle 15, thereby enabling the monitoring of the temperature of the high-pressure gas.

While maintaining the above state, a pressure-reducing valve 12 shown in FIG. 1 is opened for rapidly expanding the supercritical fluid in the reactor 7. This remarkably reduces the solubility of each solute dissolved in the supercritical fluid. As a result, each solute is precipitated in the form of particulate.

In this process, the affinities between the coloring agent component and binding resin component, and that between the entrainer and the supercritical fluid are properly determined and the pressure adjustment conditions for the reactor 7 are properly determined. Developer particulates can thereby be obtained having a state wherein the coloring agent component is almost uniformly dispersed and embedded in the binding resin component precipitated in the form of particulate. These developer particulates, having a volume average particle diameter of 3 μm to 7 μm, are colleted via the nozzle 15 in a particle collecting box 17.

Thereafter, for adjusting the fluidity of the obtained developer, if necessary, a fine powder of silica, for example, may be applied on the surface of the developer by publicly known methods (e.g., use of a dry mixer), thereby manufacturing final developers.

Hereinafter, the embodiment, and the actions and effects obtained by the invention of each claim, will be explained.

(claim 1)

According to conventional developer manufacturing methods, insoluble materials of developer composition are discharged and thereby an agglomeration is generated. Further, shear force is applied in the precipitation process, so that fibrous products are precipitated.

A method of the present invention is characterized in that a reactor provided with at least a stirring mechanism and a mechanism for discharging dissolved components has a developer material carrier comprising a mesh that prevents the passage of treated materials and allows the passage of a supercritical or subcritical fluid. The method produces the following actions and effects: only the dissolved components are dispersed in the supercritical or subcritical fluid in the reactor because of capturing of the insoluble components, so that the generation of coarse particles can be prevented and particles having a desired particle shape can be produced.

(claim 2)

An apparatus of the present invention is characterized in the same manner as claim 1 in that a reactor provided with at least a stirring mechanism and a mechanism for discharging dissolved components has a developer material carrier comprising a mesh that prevents the passage of treated materials and allows the passage of a supercritical or subcritical fluid. The apparatus produces the following actions and effects: only the dissolved components are dispersed in the supercritical or subcritical fluid in the reactor because of capturing of the insoluble components, so that the generation of coarse particles can be prevented and particles having a desired particle shape can be produced.

(claim 3)

A mechanism for storing developer materials cannot remove insoluble components when materials having uneven particle sizes are used, finally causing the generation of coarse particles. However, according to the present invention, the developer material carrier comprises a plurality of meshes, thereby producing the following actions and effects: the use of the meshes enables more uniform elution, so that a developer having a desired particle diameter can be obtained.

(claim 4)

It takes much time to dissolve developer materials in a supercritical or subcritical fluid, thus posing an obstacle to the enhancement of the production efficiency. However, the developer material carrier of the present invention has a configuration such that a stirring mechanism is incorporated thereinto. Such configuration produces the following actions and effects: the incorporation of the stirring mechanism in the developer material carrier increases the solubility speed of the developer materials in the supercritical or subcritical fluid, so that the production efficiency can be improved.

(claim 5)

It takes much time to dissolve a developer material in a supercritical or subcritical fluid, thus posing an obstacle to the enhancement of the production efficiency. According to the present invention, the developer material carrier rotates together with the stirring mechanism. Such configuration produces the following actions and effects: the solubility speed of the developer material in the supercritical or subcritical fluid is increased, so that the production efficiency can be improved.

(claim 6)

When the developer material carrier rotates in the same direction as the stirring mechanism, the fluid flows in one direction, so that sometimes little stirring effect can be obtained. According to the present invention, the developer material carrier rotates in reverse relative to the rotation direction of the stirring mechanism. Such configuration produces the following actions and effects: the reverse rotation increases the frequency of contacts between the supercritical fluid and the developer materials, so that the solubility speed can be increased.

(claim 7)

When a developer material carrier and a stirring mechanism are separately provided, dead space is generated. Therefore, when the stirring mechanism is washed, developer materials may remain as contaminants in the mechanism. According to the present invention, the developer material carrier is used as a stirring mechanism. Such configuration produces the following actions and effects: the developer material carrier has a combined function of the stirring mechanism, and thereby the number of the parts in the reactor is decreased, so that the influences such as contaminations can be prevented.

EXAMPLES AND COMPARATIVE EXAMPLES

The present invention will hereinafter be described in accordance with concrete examples and comparative examples. However, it should be noted that the scope of the present invention is not limited to these examples.

Example for Manufacturing Developer

A developer manufacturing apparatus as shown in FIG. 1 was used for manufacturing a developer of the present invention. A reactor 7 bad a volumetric capacity of, for example, 1000 $cm^3$, and contained a developer material carrier 8 therein. In the present example, the gas used as a supercritical fluid was carbon dioxide. In addition, ethanol (commercially available as a common reagent) was used as an entrainer.

50 g of polyester resin (Sanyo Chemical Industries Co., Ltd.; Product Name: EP208) as a binding resin component and 20 parts by weight of carbon black (Mitsubishi Chemical Co., Ltd., Product Name: MA100) as a pigment based on 100 parts by weight of the polyester resin were inputted in the reactor in advance. It should be noted that the entrainer was incompatible with the binding resin component at ordinary temperature and ordinary pressure The carbon dioxide gas supplied from a gas cylinder 1 was pressurized by a pressure pump 2 and introduced into the reactor 7 via a valve 6. 200 ml of ethanol as the entrainer 3 was also introduced into the reactor 7 via a pressure pump 4.

At this stage, a pressure-reducing valve 12 for discharging remained closed, and the pressure inside the reactor 7 increased through the introduction of pressurized carbon dioxide. Further, heaters 10, 13, and 14 were used for adjusting the temperature in the reactor 7, the temperature of a connecting mechanism, and the temperatures of a jet mechanism and in the vicinity of an outlet thereof.

When the reactor 7 has an internal pressure of 7.3 MPa or more, the inside of the reactor 7 becomes supercritical. Carbon dioxide has a critical temperature of 304.6 K, and thus carbon dioxide becomes supercritical by setting the temperature to 304.6 K or more.

After keeping this state for, for example, 20 minutes, the pressure-reducing valve 12 was opened to discharge the mixed solution in the reactor 7 from the nozzle 15 into a particle collecting box 17. Rapid expansion was caused thereby, and developer particulates that contained the pigment uniformly dispersed in the binding resin component precipitated in a generally spherical shape were deposited and collected in the particle collating box 17.

Here, the carbon dioxide as the supercritical fluid and the ethanol as the entrainer contained in the mixed solution were separated from each other by a recovery mechanism (not shown) for recycling purposes.

In the present example, since the entrainer incompatible with the binding resin component was used at ordinary temperature and ordinary pressure, the agglomeration (that is, the bonding between themselves) of the obtained developer particulates can be prevented even if a trace amount of the entrainer adheres to the surface of the developer particulates. Thus, developer particulates can be obtained having a fine particle shape. Subsequently, 0.1 parts by weight of silica (Nihon Aerosil Co., Ltd.; Product Name: R742) was added to cover the developer particulates by a well-known method (e.g., by a dry mixer) for adjusting fluidity or the like, and then final developers were obtained.

Figure 2B:
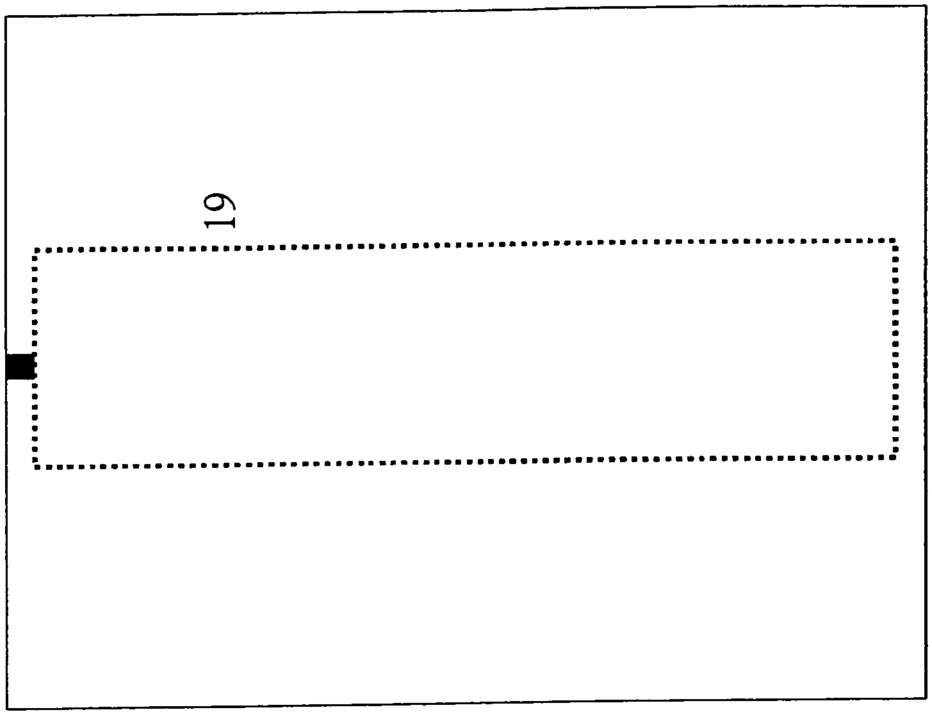
FIGS. 2A and 2B are internal diagrams of a high pressure cell of the developer manufacturing apparatus according to the present invention.
Figure 2A:
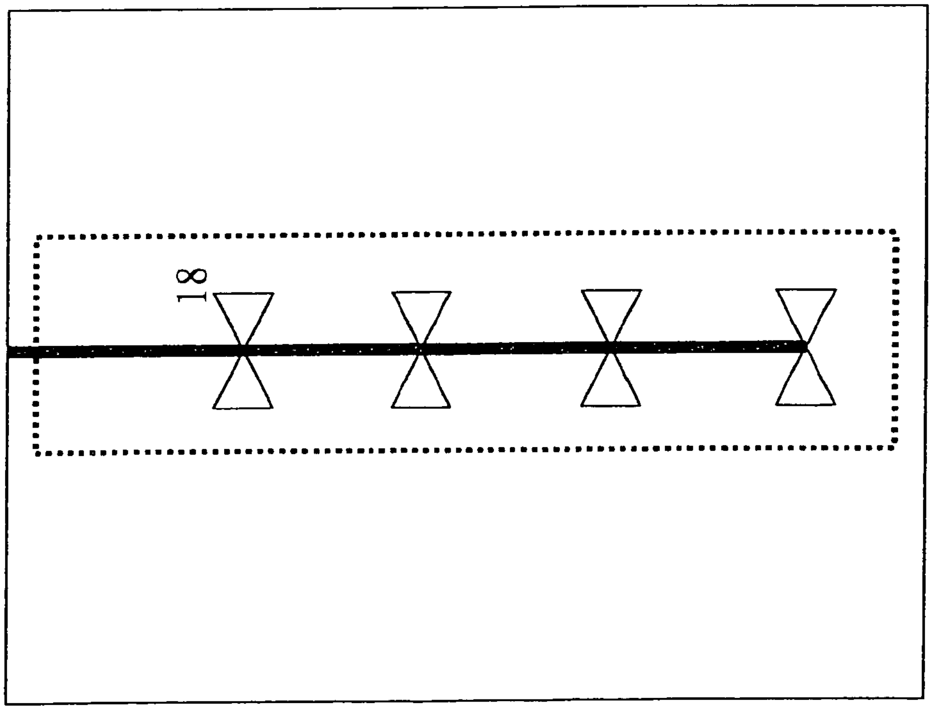
Figure 3:
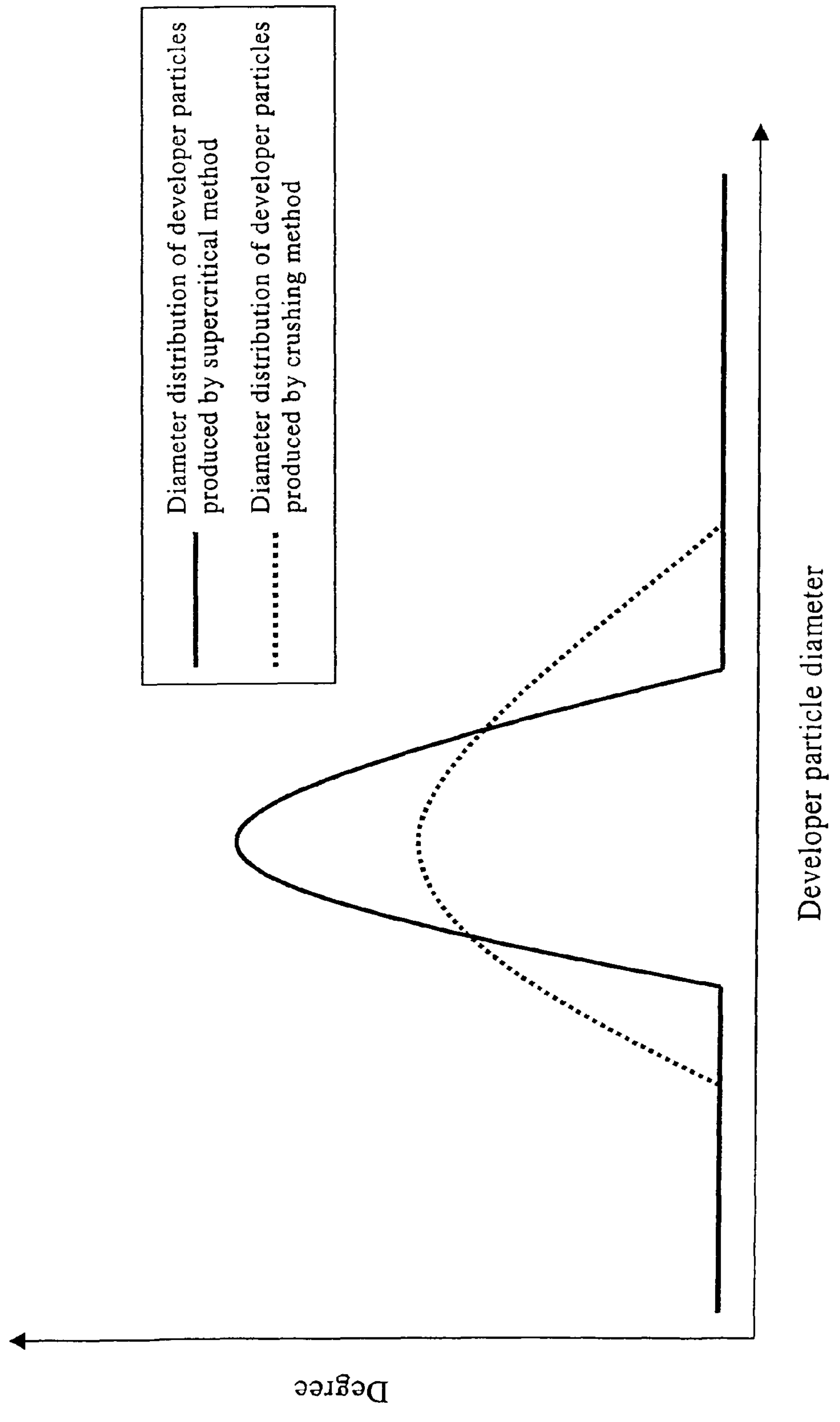
FIG. 3 is a graph showing the comparison in particle diameter distribution of developers produced according to the present invention and according to a crushing method.
Figure 4B:
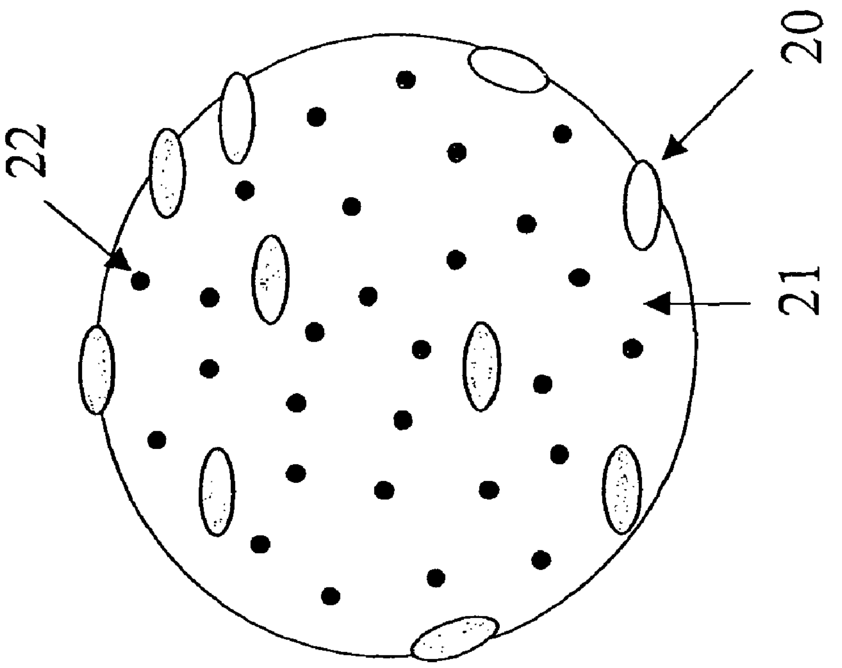
FIGS. 4A and 4B are schematic views showing the results of observation by a TEM (transmission electron microscope) of developers described in Example 3 of the present invention.
Figure 4A:
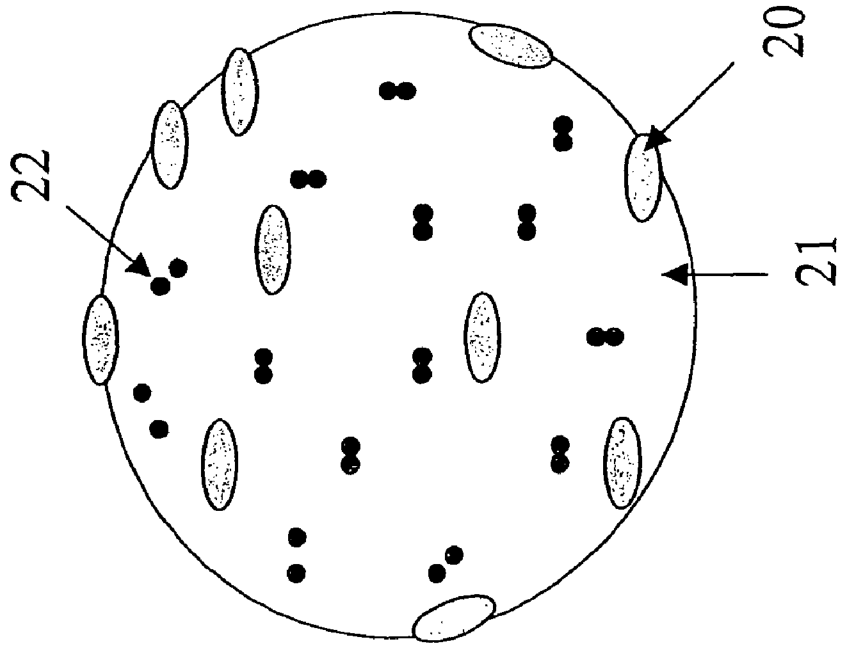

FIGS. 2A and 2B illustrate the inside of the reactor 7. FIG. 2A shows a reactor having stirrers 18 and FIG. 2B shows a reactor having a developer material carrier 19 that incorporates stirrers therein.

Example 1

A developer was manufactured in the same manner as the manufacturing example except that the developer material carrier was composed of one sheet of 400 mesh.

When the reactor 7 has an internal pressure of 7.3 MPa or more, the reactor 7 has a supercritical state inside. In Example 1, the internal pressure of the reactor 7 was set to 20 MPa by adjusting valves 5 and 6 so that at least the binding resin component in the reactor 7 was dissolved.

The thus-manufactured developer had a high content of pigment and excellent pigment dispersibility, and therefore a desired printing density could be obtained even with a small amount of the developer. The amount of developer necessary for obtaining a predetermined number of printouts was several times smaller than in a case where a conventional developer (e.g., developer obtained by a publicly known method involving melting, kneading, and grinding processes) is used. Therefore, a user-friendly and miniaturized image forming apparatus can be provided without shortening the exchange cycle of developer.

In the case of a developer manufactured by a conventional method (e.g., a publicly known method involving melting, kneading, and grinding processes) so as to contain a high concentration of pigment as in the present example, the formation of good images is hindered as the image quality becomes deteriorated due to fog generation or increased instability in the degree of developer charge depending on the environment in which the developer is used.

Moreover, according to conventional methods, developer particles become crushed after long usage, and thus fine powders are generated or the particle diameter distribution is changed, causing problems such as deterioration in image quality. However, the developer of the present invention can prevent the above problems, thus stably enabling the formation of good images.

Example 2

A developer was manufactured in the same manner as the above manufacturing example except that the developer material carrier 8 was composed of three sheets of 400 mesh.

Example 3

A developer was manufactured in the same manner as the above manufacturing example except that the developer material carrier 8 had a configuration wherein stirrers 18 were incorporated therein.

Example 4

A developer was manufactured in the same manner as the above manufacturing example except that the developer material carrier 8 rotated together with stirrers 18.

Example 5

A developer was manufactured in the same manner as the above manufacturing example except that the developer material carrier 8 rotated in reverse relative to the rotation direction of stirrers 18.

Example 6

A developer was manufactured in the same manner as the above manufacturing example except that the developer material carrier 8 has a configuration 19 whereby it also functions as a stirring mechanism.

[Recovery and Evaluation of Developers]

The recovery of each developer manufactured in the above examples 1 to 6 was proportionally calculated relative to the amount inputted into the reactor 7.

Ferrite carrier having an average diameter of 80 μm was mixed with 100 parts by mass of each developer prepared in Examples 1 to 6 so that a two-component developer with a developer concentration of 4% was prepared. Using the obtained developer, solid images with a dimension of 50 mm×50 mm were printed out at the initial stage and after 10,000 copies were continuously made with a printing density of 6% by an electrophotographic copier (Model No. AR-450M manufactured by Sharp). Thereafter, the densities of the image parts and the non-image parts thereof were measured by a densitometer (Model No. RD-918, Macbeth Co.). In addition, the developers were sampled from a developing device of the electrophotographic copier at the initial stage and after continuous printing of 10,000 copies, and the charge amount of each sample was measured by a blow-off method. Here, charge stability is defined as the existence of a small charge amount difference between that at the initial stage and that resulting after continuous printing of 10,000 copies.

Image density was evaluated based on three levels: excellent (1.4 or more), good (less than 1.4 to 1.2), and poor (less than 1.2).

Further, fogging was evaluated based on three levels: excellent (0.8 or less), good (1.2 to more than 0.8), and poor (more than 1.2).

Moreover, charge stability was evaluated based on three levels. When the charge after 10,000 copies is 80% to 100% of that present at the initial stage, the charge stability is considered "excellent." When the percentage is 60% to less than 80%, it is considered "good." When the percentage is less than 60%, it is considered "poor."

The relationships between developer manufacturing methods, and the recovery and the image quality are summarized in Tables 1 and 2.

TABLE 1

Relationship between developer manufacturing methods, and recovery and image quality

| | | Image density | | Fogging | | | |
|---|---|---|---|---|---|---|---|
| | Recovery (%) | Initial | After 10,000 copies | Initial | After 10,000 copies | Charge stability | Total evaluation |
| Example 1 | 42 | Excellent | Poor | Excellent | Poor | Excellent | Good |
| Example 2 | 20 | Excellent | Poor | Excellent | Good | Excellent | Good |

TABLE 2

Relationship between developer manufacturing methods, and recovery and image quality

| | | Image density | | Fogging | | | |
|---|---|---|---|---|---|---|---|
| | Recovery (%) | Initial | After 10,000 copies | Initial | After 10,000 copies | Charge Stability | Total evaluation |
| Example 1 | 42 | Excellent | Poor | Excellent | Poor | Excellent | Good |
| Example 3 | 31 | Excellent | Good | Excellent | Good | Excellent | Good |
| Example 4 | 53 | Excellent | Good | Excellent | Excellent | Excellent | Good |
| Example 5 | 60 | Excellent | Excellent | Excellent | Good | Excellent | Good |
| Example 6 | 65 | Excellent | Excellent | Excellent | Excellent | Excellent | Excellent |

As shown in FIG. 1, when the elution of the insoluble components is controlled, good results were obtained in terms of image density, fogging, and charge stability. Further, as shown in FIG. 2, excellent results were obtained in terms of image density, fogging, and charge stability by efficiently eluting the dissolved components.

The present invention can provide a developer having a uniform and fine particle shape in a narrow particle size distribution, in which a coloring agent in the developer is highly dispersed at the primary particle level. At the same time, the present invention provides a method and an apparatus for manufacturing such developer, which enable continuous and efficient production without opening and closing a reactor.

What is claimed is:

1. A developer manufacturing method, comprising the steps of:

providing a reactor comprising a stirring mechanism, a mechanism for discharging dissolved components and a developer material carrier comprising a plurality of sheets of mesh that prevents the passage of treated materials and allows the passage of the supercritical or subcritical fluid, the stirring mechanism being disposed within the developer material carrier;

dissolving a binding resin component in a supercritical or subcritical fluid so that the binding resin component is blended with a coloring agent component; and reducing the solubility of the binding resin component in the supercritical or subcritical fluid so that the binding resin component is precipitated in the form of particles with the coloring agent component dispersed in the interior of the binding resin component, wherein the plurality of sheets of mesh provides a more uniform discharge of dissolved resin and dispersed coloring agent and developer having a desired particle diameter.

2. A method of manufacturing a developer, the method comprising:

providing a reactor comprising a stirring mechanism, a mechanism for discharging dissolved components and a developer material carrier comprising a plurality of sheets of mesh that prevents the passage of treated materials and allows the passage of the supercritical or subcritical fluid, the stirring mechanism being disposed within the developer material carrier;

providing an amount of binding resin and coloring agent in the developer material carrier;

dissolving a binding resin component in a supercritical or subcritical fluid so that the binding resin component is blended with a coloring agent component;

rotating the stirring mechanism within the developer material carrier to disperse the coloring agent and binding resin in the supercritical or subcritical fluid;

eluting dissolved binding resin and dispersed coloring agent through the sheets of mesh to discharge the dissolved binding resin and dispersed coloring agent; and reducing the solubility of the binding resin component in the supercritical or subcritical fluid so that the binding resin component is precipitated in the form of particles with the coloring agent component dispersed in the interior of the binding resin component, wherein the plurality of sheets of mesh provides a more uniform discharge of dissolved resin and dispersed coloring agent and developer having a desired particle diameter.

3. The method of manufacturing a developer as set forth in claim 2, further comprising rotating both the stirring mechanism and the developer material carrier.

4. The method of manufacturing a developer as set forth in claim 2, further comprising rotating the stirring mechanism in one direction and the developer material carrier in the opposite direction.

5. The method of manufacturing a developer as set forth in claim 2, further comprising providing a coloring agent including organic pigments, inorganic pigments, or a combination thereof.

6. The method of manufacturing a developer as set forth in claim 5, wherein the pigments have a particle diameter of from 40 nm to 400 nm.

7. The method of manufacturing a developer as set forth in claim 5, wherein the pigments have a particle diameter of from 100 nm to 200 nm.

8. The method of manufacturing a developer as set forth in claim 2, further comprising providing a binding resin having a weight average molecular weight of $1\times10^3$ to $1\times10^6$.

9. The method of manufacturing a developer as set forth in claim 2, further comprising producing developer particulates having an average particle diameter of 3 μm to 7 μm.

10. The method of manufacturing a developer as set forth in claim 2, further comprising providing an entrainer to the supercritical or subcritical fluid, thereby enhancing the affinity between the supercritical or subcritical fluid and the solutes.

11. The method of manufacturing a developer as set forth in claim 10, further comprising selecting the entrainer from the group consisting of methanol, ethanol, isopropanol, butanol, methyl ethyl ketone, acetone, cyclohexanone, diethyl ether, tetrahydrofuran, toluene, benzene, cyclohexane, ethyl acetate, butyl acetate, methyl acetate, alkyl carbonic ester, chlorobenzene, dichloromethane, water and ammonia.

* * * * *